(12) United States Patent
Haveson et al.

(10) Patent No.: US 7,881,315 B2
(45) Date of Patent: Feb. 1, 2011

(54) LOCAL PEER-TO-PEER DIGITAL CONTENT DISTRIBUTION

(75) Inventors: Ryan A. Haveson, Monroe, WA (US); Darren R. Davis, Woodinville, WA (US); Max G. Morris, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 936 days.

(21) Appl. No.: 11/475,314

(22) Filed: Jun. 27, 2006

(65) Prior Publication Data

US 2007/0297426 A1  Dec. 27, 2007

(51) Int. Cl.
*H04L 12/28* (2006.01)
*H04L 12/56* (2006.01)

(52) U.S. Cl. .................. 370/401; 370/465; 705/26; 705/51

(58) Field of Classification Search ................. 370/401, 370/435; 705/26, 51
See application file for complete search history.

(56) References Cited

U.S. PATENT DOCUMENTS

| 5,617,539 | A | * | 4/1997 | Ludwig et al. ............. 709/205 |
|---|---|---|---|---|
| 6,532,368 | B1 | | 3/2003 | Hild et al. |
| 6,792,323 | B2 | | 9/2004 | Krzyzanowski et al. |
| 7,461,067 | B2 | | 12/2008 | Dewing et al. |
| 2003/0055898 | A1 | | 3/2003 | Yeager et al. |
| 2003/0088571 | A1 | | 5/2003 | Ekkel |
| 2003/0097299 | A1 | | 5/2003 | O'Kane et al. |
| 2003/0105831 | A1 | | 6/2003 | O'Kane |
| 2003/0120928 | A1 | | 6/2003 | Cato et al. |
| 2003/0158958 | A1 | | 8/2003 | Chiu |
| 2003/0174838 | A1 | | 9/2003 | Bremer |
| 2003/0191828 | A1 | | 10/2003 | Ramanathan et al. |

(Continued)

FOREIGN PATENT DOCUMENTS

GB         2380378 A1     4/2003

(Continued)

OTHER PUBLICATIONS

Barrett R., "Intermediaries: An approach to manipulating information streams",1999, vol. No. 38(4), http://www.research.ibm.com/journal/sj/384/barrett.html.

(Continued)

*Primary Examiner*—Pankaj Kumar
*Assistant Examiner*—Lonnie Sweet
(74) *Attorney, Agent, or Firm*—Mayer & Williams PC

(57) ABSTRACT

Electronic devices such as media players are configured for participation in activities relating to local, peer-to-peer distribution of digital content. In an exemplary distribution transaction, digital content items such as audio files, video files, text files, multimedia files, data files, playlists, and metadata are distributable between a source device and a sink device based on the acts of: identifying digital content item(s); determining the proximity of the source device to the sink device; and if the potential source and sink communication devices are deemed to be in proximity, establishing a peer-to-peer communication session (using a predetermined communication protocol such as Wireless Fidelity ("WiFi"), Bluetooth, or HiperLAN) between the source and sink devices. The digital content item(s) can be asynchronously distributed, via the peer-to-peer communication session, from a computer-readable medium accessible by the source communication device to a computer-readable medium associated with the sink communication device.

12 Claims, 4 Drawing Sheets

U.S. PATENT DOCUMENTS

| | | |
|---|---|---|
| 2003/0212804 A1 | 11/2003 | Hashemi |
| 2004/0002359 A1 | 1/2004 | Deas et al. |
| 2004/0003090 A1 | 1/2004 | Deeds |
| 2004/0030651 A1 | 2/2004 | Kim et al. |
| 2004/0041836 A1 | 3/2004 | Zaner et al. |
| 2004/0068532 A1 | 4/2004 | Dewing et al. |
| 2004/0117442 A1 | 6/2004 | Thielen |
| 2004/0127196 A1 | 7/2004 | Dabbish et al. |
| 2004/0148503 A1 | 7/2004 | Sidman |
| 2004/0248601 A1 | 12/2004 | Chang |
| 2004/0249768 A1 | 12/2004 | Kontio et al. |
| 2005/0004875 A1 | 1/2005 | Kontio et al. |
| 2005/0004995 A1 | 1/2005 | Stochosky |
| 2005/0027871 A1 | 2/2005 | Bradley et al. |
| 2005/0204019 A1 | 9/2005 | Flynn et al. |
| 2005/0204038 A1 | 9/2005 | Medvinsky et al. |
| 2005/0278259 A1 | 12/2005 | Gunaseelan et al. |
| 2005/0286546 A1 | 12/2005 | Bassoli et al. |
| 2006/0004600 A1 | 1/2006 | Summer et al. |
| 2006/0041943 A1* | 2/2006 | Singer et al. .................. 726/27 |
| 2006/0056326 A1 | 3/2006 | Croome |
| 2006/0064386 A1 | 3/2006 | Marking |
| 2006/0069798 A1 | 3/2006 | Li et al. |
| 2006/0075225 A1 | 4/2006 | Flynn et al. |
| 2006/0123484 A1 | 6/2006 | Babic et al. |
| 2006/0165060 A1* | 7/2006 | Dua ........................... 370/352 |
| 2006/0253894 A1* | 11/2006 | Bookman et al. .............. 726/2 |
| 2006/0256959 A1* | 11/2006 | Hymes .................. 379/433.04 |
| 2006/0258289 A1* | 11/2006 | Dua ........................... 455/41.3 |
| 2007/0016654 A1 | 1/2007 | Bowles et al. |
| 2007/0105496 A1* | 5/2007 | Bonta et al. ................. 455/13.1 |
| 2007/0136390 A1* | 6/2007 | Blum et al. .................. 707/201 |
| 2007/0226238 A1 | 9/2007 | Kiilerich et al. |

FOREIGN PATENT DOCUMENTS

| | | | |
|---|---|---|---|
| KR | 1020050060783 A | 6/2005 | |
| WO | 0146843 A2 | 6/2001 | |
| WO | WO0146843 A2 | 6/2001 | |
| WO | 0237943 A2 | 5/2002 | |
| WO | WO0237943 A2 | 5/2002 | |
| WO | 2004075169 A3 | 9/2004 | |
| WO | 2005024650 A1 | 3/2005 | |
| WO | 2005091595 A1 | 9/2005 | |
| WO | WO2005091595 A1 | 9/2005 | |
| WO | 2005119476 A2 | 12/2005 | |
| WO | 2005125200 A2 | 12/2005 | |
| WO | WO2005119476 A2 | 12/2005 | |

OTHER PUBLICATIONS

Lee et al., "Towards Interoperable Heterogeneous Information Systems", 1997, pp. 112-114, ACM Press, New York, USA, http://delivery.acm.org/10.1145/340000/331721/p112-Iee.pdf?key1=331721&key2=3519314411&coll=GUIDE&dl=GUIDE&CFID=72881786&CFTOKEN=23938169.

Final Office Action mailed Oct. 29, 2008 in U.S. Appl. No. 11/472,582.

Non Final Office Action mailed Apr. 2, 2008 in U.S. Appl. No. 11/472,582.

Sanneblad et al., "'Why is everyone inside me?!' Using Shared Displays in Mobile Computer Games", http://www.sanneblad.se/johan/thesis/documents/thesis-sanneblad-5.pdf, Proceedings of the Third International Conference on Entertainment Computing (ICEC 2004), Eindhoven, The Netherlands.

"AgentArts", "Innovent Case Study, Aug. 2004", http://europe.nokia.com/BaseProject/Sites/NOKIA_MAIN_18022/CDA/Categories/AboutNokia/Venturing/InnoventCaseStudies/_Content/_St, 6 pages.

Bassoli et al., "tunA: Local Music Sharing with Handheld Wi-Fi Devices", http://web.media.mit.edu/~stefan/hc/publications/Bassoli04TunaWW.pdf.

Barrett, "Intermediaries: An approach to Manipulating Information Streams", 1999, vol. No. 38 (4), http://www.research.ibm.com/journals/sj/384/barrett.html, 13 pages.

Non Final Office Action mailed Oct. 17, 2008 in U.S. Appl. No. 11/516,879.

Final Office Action mailed Feb. 26, 2009 in U.S. Appl. No. 11/516,879.

International Search Report, PCT/US2007/077256, Dated Jan. 4, 2009, pp. 1-10.

Einhorn et al., "Peer-to-Peer Networking and Digital Rights Management: How Market Tools Can Solve Copyright Problems", http://www.consor.com/editor/docs/Einhorn%20Peer%20to%20peer%20networking%20and%20digital%20rights%20management.pdf, 31 pages, date unknown, but prior to the filing date of the instant application.

Kalker et al., "Music2Share—Copyright-Compliant Music Sharing in P2P Systems", Proceedings of the IEEE, Jun. 2004, vol. 92, No. 6, http://ict.ewi.tudelft.nl/pub/inald/0129, 10 pages.

Kerenyi, "Business Models for Mobile Music and DRM", Nov. 2004, www.indicare.org/tiki-download_file.php?fileId=49, 18 pages.

Pitkanen et al., "Legal Protection of Mobile P2P Databases", http://www.hiit.fi/de/mobileipr/database_lawtech2002.pdf, 6 pages.

Final Rejection in corresponding U.S. Appl. No. 11/516,879 dated Mar. 17, 2010, 19 pages.

* cited by examiner

LOCAL PEER-TO-PEER DIGITAL CONTENT DISTRIBUTION

BACKGROUND

Digital content such as digital media content (video, images, playlists, multimedia files, and text, for example) is captured and consumed using an ever-increasing variety of media rendering devices. Some examples of devices used to capture and consume digital content include personal computers ("PCs"), personal digital assistants, portable digital media players, and mobile phones.

One way of capturing digital content for use on a media rendering device is by copying or moving the digital content directly from a local digital content source to the media rendering device via a wired transmission medium such as a port, a bus, or a portable computer-readable memory such as a semiconductor memory, a magnetic storage device, or an optical storage device.

Increasingly, however, media rendering devices are equipped with connectivity features that allow the media rendering devices to communicate with other devices over networks, and to capture digital content via the networks. Wide area networks ("WANs") are wireless or wired geographically dispersed networks generally covering geographic regions of more than a few hundred meters. The Internet is one example of a WAN. Local-area networks ("LANs") are wireless or wired networks that facilitate the transmission or receipt of information within relatively small physical areas surrounding a device or an entity such as a person or a business (generally, up to a few hundred meters).

Podcasting is a popular technique for distributing digital content via the Internet. Podcasting allows a user of a media rendering device (such as a portable digital media player) to subscribe to receive certain digital content that has been published to a location on the World Wide Web. Another popular way of capturing digital content via the Internet is through the use of large, public, peer-to-peer file-sharing services such as Napster or Kazaa. Digital content may also be captured via instant messaging, which is user-initiated, real-time electronic communication between two or more pre-affiliated entities (contacts in a buddy list, for example) over a network.

LANs are also used for capturing digital content. One type of LAN is a wireless LAN ("WLAN"). A WLAN is generally identified by the air interface protocol(s) used for communication within the WLAN. Currently popular air interface protocols include the Wireless Fidelity ("WiFi") series of protocols promulgated by the Institute of Electrical and Electronics Engineers ("IEEE") and the HiperLAN series of protocols developed by the European Telecommunications Standards Institute.

Home-based WLANs are commonly used to transfer digital content from one media rendering device to another—a user may wirelessly transfer music from his personal computer to his portable digital media player, for example. WLANs, however, are increasingly available to the public within areas such as retail centers or cities, thus creating opportunities for local communication between many types of communication devices operated by many different people or businesses. In addition to WLAN technology, cable replacement technologies exist. Cable replacement technologies facilitate direct local communication between two endpoints using short-range radio frequencies. Like WLANs, cable replacement technologies are identified by the air interface protocols used for communication. Current cable replacement air interface protocols include Bluetooth and Wireless USB protocols.

Although it is becoming easier to capture and use digital content using a wide variety of media rendering devices, the constant chore of discovering fresh digital content remains. Discovering digital content generally requires active engagement with various content distribution options. Someone inclined to spend time actively discovering fresh digital content may engage in one or more of the following activities, among others: tuning in to live broadcasts of digital content (such as radio, television, or Internet broadcasts) to identify interesting content; seeking out digital content reviews such as music reviews; purchasing digital content at physical or virtual stores; creating playlists; or identifying and affiliating with people or groups with interesting digital content inventories.

A system referred to as TunA, which facilitates passive receipt of digital audio content in a synchronized, peer-to-peer manner using WLANs, has been proposed. TunA is a mobile wireless application that allows synchronized peer-to-peer audio streaming via a WiFi network—users of handheld music players capable of WiFi communication are able to "tune in" to other nearby music players and listen to what someone else is listening to.

Synchronized peer-to-peer audio streaming provides exposure to a limited subset of digital content (mainly music) in an ad-hoc, transient, and local manner. Receipt of audio streams in such a manner generally does not significantly reduce the constant chore of discovering and capturing fresh digital content for use on media rendering devices. This is because, among other things, "live" broadcasts are but only one way in which digital content is discoverable; because after identifying digital content via live broadcasts, the chore of obtaining the digital content from another source remains; and because digital content is more than simply music, including, for example, video, images, multimedia files, text, data, playlists, and even metadata. Moreover, spontaneous audio streaming has the potential to be unduly intrusive, disruptive, or distracting for use in a variety of venues.

Techniques for discovering a wide variety of digital content using local peer-to-peer communication are desirable, along with flexible and legal options for distributing and managing the discovered digital content.

It will be appreciated that the claimed subject matter is not limited to implementations that solve any or all of the disadvantages of specific peer-to-peer digital content sharing systems or aspects thereof.

SUMMARY

Methods, systems, apparatuses, and articles of manufacture discussed herein involve configuration of wireless-enabled electronic devices (referred to as communication devices) for participation in activities relating to local, peer-to-peer distribution of digital content items. Examples of digital content items include but are not limited to digital media items (such as audio files, video files, image files, text files, multimedia files, data files, and playlists) and metadata associated with such digital media items. Digital content items are generally stored on computer-readable media within communication devices, although digital content items may be stored in computer-readable media remotely accessible by such communication devices.

In particular, options for publishing and/or discovering digital content items stored on a computer-readable medium accessible by a source communication device operated by a source entity, and options for distributing the digital content item(s) to a proximate sink communication device operated by a sink entity via a local area network are described. As used herein, the term "distribute" and forms thereof includes both acts associated with transferring a digital content item via a source communication device and acts associated with receiving a digital content item via a sink communication device.

Certain acts associated with methods for distributing digital content include: identifying digital content item(s); determining the proximity of a potential source communication device to a potential sink communication device; and if the potential source and sink communication devices are deemed to be in proximity, establishing a peer-to-peer communication between the source and sink communication devices. Communications between the source and sink communication devices occur via a predetermined communication protocol (for example, Wireless Fidelity ("WiFi"), HiperLAN, Bluetooth or Wireless USB). The digital content item(s) can be asynchronously distributed, via the peer-to-peer communication session, from a computer-readable medium accessible by the source communication device to a computer-readable medium associated with the sink communication device. The access requested/granted to distributed digital content item(s) may be a one-time download of the digital content item(s) or information relating thereto, and/or may be a subscription to updates of the digital content item(s).

In one exemplary implementation, an operator of a sink communication device reviews information about the digital content item(s) available for distribution, and selects the digital content item(s) he desires to receive via a user interface. Based on the operator's selection, the sink communication device sends a request for access to the desired digital content item(s) to the source communication device.

In another exemplary implementation, the source communication device and the sink communication device have pre-consented to automatic participation in peer-to-peer digital content distribution activity. If is determined that a sink communication device that has published the availability of digital content item(s) for distribution is proximate to a participating source communication device, digital content item(s) are automatically selected for distribution via a negotiation between the source communication device and the sink communication device. Criteria for selection of digital content item(s) for distribution may be established by the source communication device (or its operator), the sink communication device (or its operator), or a combination thereof. Examples of criteria include but are not limited to available memory, file size, remaining battery power, general favorites or preferences, or particular metadata associated with available digital content item(s) such as author, title, and the like.

In this manner, a wide variety of digital content is discoverable and distributable by communication devices and entities operating the devices—potentially wherever participating media rendering devices co-exist. A sink communication device that receives particular digital content may later become a source communication device that supplies the same digital content, providing an interesting business model for digital content distribution. Moreover, communication devices may function as both sources and sinks in the same transaction, thus increasing opportunities for cross-pollination of digital content.

This Summary is provided to introduce a selection of concepts in a simplified form. The concepts are further described in the Detailed Description section. Elements or steps other than those described in this Summary are possible, and no element or step is necessarily required. This Summary is not intended to identify key features or essential features of the claimed subject matter, nor is it intended for use as an aid in determining the scope of the claimed subject matter.

DETAILED DESCRIPTION

Figure 1:
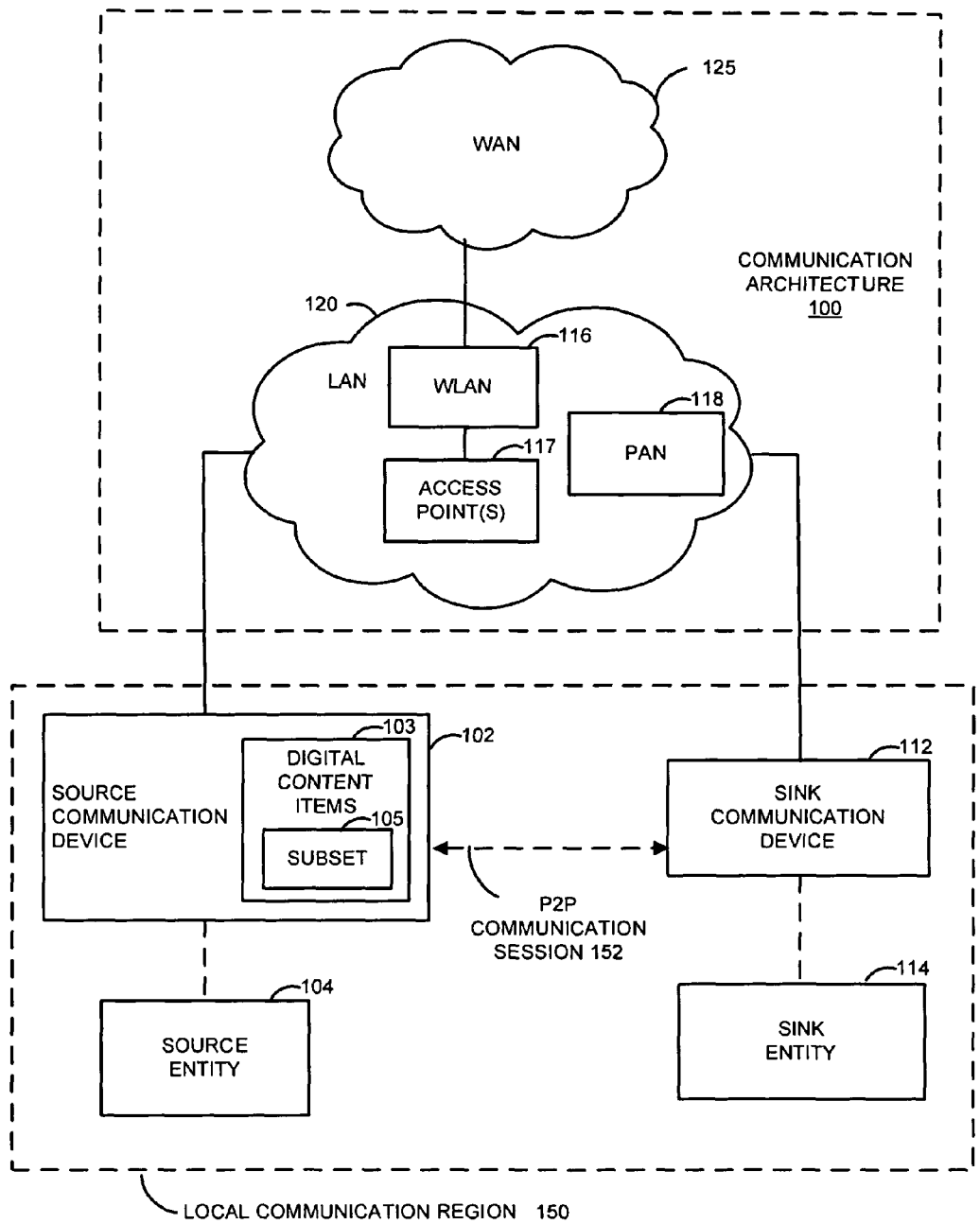
FIG. 1 is a simplified functional block diagram of a communication architecture over which local peer-to-peer communications between a source communication device operable by a source entity and a sink communication device operable by a sink entity can occur.

Turning to the drawings, where like numerals designate like components, FIG. 1 is a simplified functional block diagram of a communication architecture 100, which is used for establishing communications within a local communication region 150. Communication architecture 100 includes one or more LANs 120. One type of LAN 120 is a wireless local area network ("WLAN") 116, accessed by one or more access points 117. Another type of LAN 120 is a personal area network ("PAN") 118, such as a wireless cable replacement system that allows direct communication between local devices. Communication architecture 100 also optionally includes a wide-area network ("WAN") 125.

Optional WAN 125 represents one or more geographically dispersed networks, generally covering geographic regions of more than a few hundred meters. WAN 125 may be a packet-switched network or a circuit-switched network. A packet-switched network routes packets of data between equipment based on destination addresses of the equipment. The Internet is one example of a packet-switched WAN. In a circuit-switched network, a physical path or communication channel is dedicated to a connection between equipment. Examples of circuit-switched WANs are portions of the public switched telephone network ("PSTN") and radio frequency communication networks such as certain cellular or satellite communication networks.

WLAN 116 represents one or more local area networks serving local communication region 150. A WLAN is generally identified by the air interface protocol(s) used for communication between nodes therein. A node is a processing location within WLAN that has a unique address (such as a media access control ("MAC") address or an Internet Protocol ("IP") address). Nodes may be fixed (for example, access points 117 (discussed further below) or mobile (for example, communication devices carried by people within local communication region 150). Currently popular WLAN air interface protocol(s) include the Wireless Fidelity ("WiFi") series of protocols promulgated by the Institute of Electrical and Electronics Engineers ("IEEE"), the HiperLAN series of protocols developed by the European Telecommunications Standards Institute, and Bluetooth protocols. It will be appreciated that any air interface protocol now known or later developed by be used within WLAN 116.

Access point 117 is a physical or logical element that provides a point of entry, such as a communication hub, into infrastructure or services associated with WLAN 116 and/or WAN 125, accessible by communication equipment operating within local communication region 150. Internal arrangements, architectures and principles of operation of access points are well known. Although one access point 117 is shown, it will be appreciated that multiple access points 117 may serve local communication region 150.

PAN 118 represents any technology or system usable for direct communication between processing locations close to a particular person. Access point(s) 117 are not required to enable such communication, but PAN technologies or systems may optionally be used to connect to other LANs 120 or to WAN 125. The reach of a PAN is generally a few meters. Most wireless PANs utilize some form of wireless cable replacement technology. Wireless cable replacement technologies are generally identified by the air interface protocols used for communication between processing locations. Currently popular air interface protocols include Bluetooth, Wireless USB, and various proprietary protocols. The WiFi series of protocols may also be used to create wireless cable replacement topologies.

Local communication region 150 is a relatively small physical area (for example, up to a few hundred meters) served by WLAN 116 and/or PANs 118 within which local communications such as wireless communications are established between nodes. It will be appreciated that the physical boundaries of local communication region 150 may be defined by dynamic parameters such as signal strength, access point location, and relationships between network operators, among other parameters. It will also be appreciated that the physical boundaries of communication region 150 may be different for WLAN 116 and PANs 118. Multiple communication regions may exist with various amounts of overlapping coverage (or no overlapping coverage).

One type of communication established within local communication region 150 is a peer-to-peer ("P2P") communication session 152 between a source communication device 102 operable by a source entity 104 and a proximate sink communication device 112 operable by a sink entity 114. P2P communication session 152 represents any local, peer-to-peer physical or virtual connection between source communication device 102 and sink communication device 112. Although in practical application P2P communication session 152 may often be wireless, it will be appreciated that P2P communication session 152 may be wired, wireless, or any combination thereof. It will also be appreciated that it is possible that the communication technologies and protocols used within communication region 150 are not immediately compatible. For example, devices such as source communication device 102 and sink communication device 112 operable within communication region 150 may not necessarily be able to communicate directly with each other if the devices do not support the same or compatible communication protocols. It will be understood that the user impact of such incompatibilities may be managed by applying various wired or wireless bridging techniques, which are generally known to one skilled in the art, between communication protocols to enable a communication session such as P2P communication session 152 to be established even when participating devices do not support the same communication protocols.

Source communication device 102 is any electronic device (or any physical or logical element of such an electronic device, either standing alone or included in other devices), which is configured for local communication within LAN 120 (for example, either using WLAN 116 or a particular PAN 118, or both) and which is responsive to source entity 104. Source entity 104 is a person or business operating source communication device 102. Among other things, source communication device 102 facilitates the distribution of (generally, the transmission of) one or more digital content items 103 to sink communication device 112 via P2P communication session 152. Subset 105 represents one or more digital content items 103 available for distribution via P2P communication session 152. It will be understood that subset 105 may include one, some or all digital content items 103. The derivation of subset 105, which may occur in a wide variety of ways, is discussed further below, in connection with FIG. 3).

Figure 4:
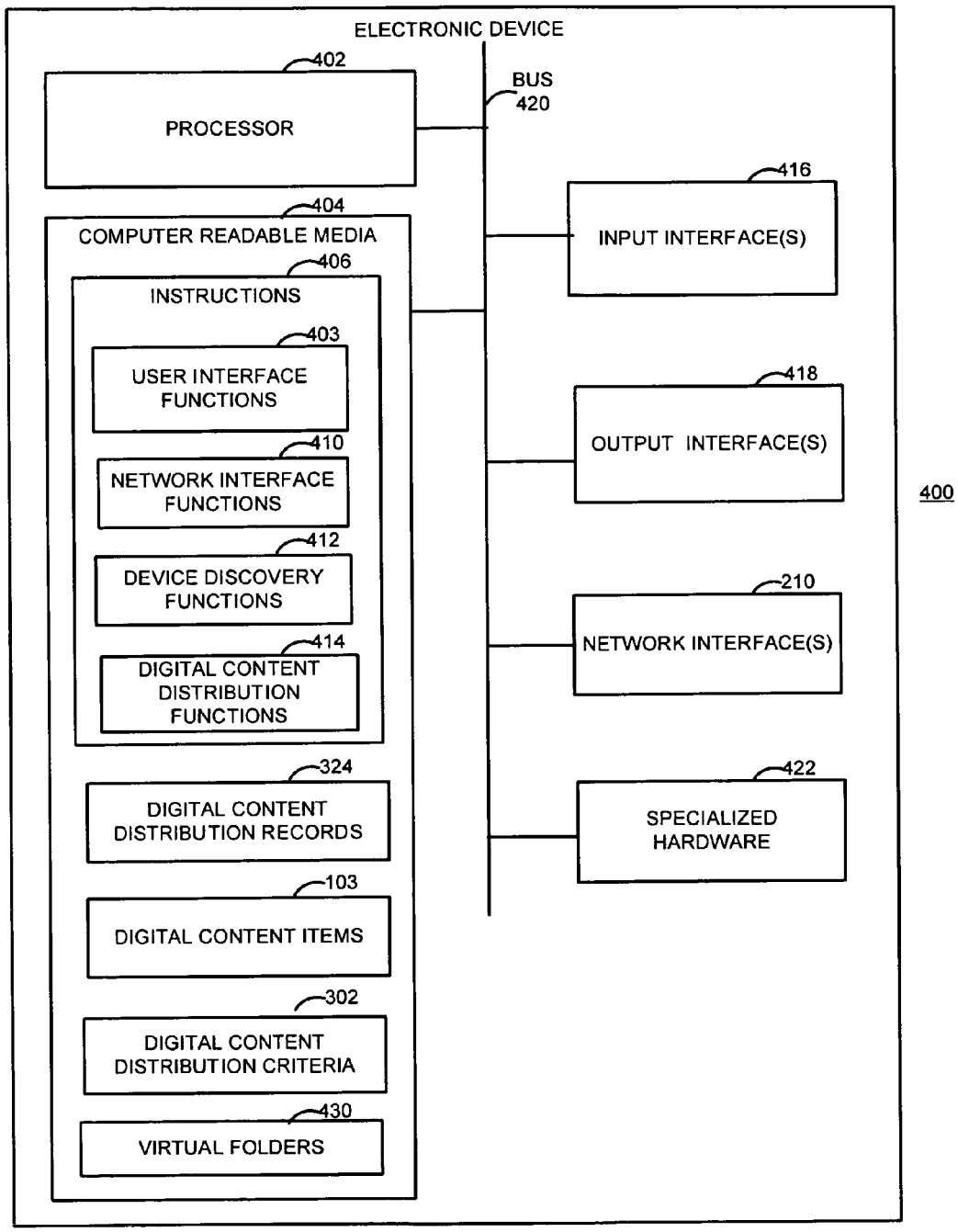
FIG. 4 is a simplified functional block diagram of an exemplary configuration of an electronic device, with which aspects of the system shown in FIG. 2 and/or the method illustrated in FIG. 3 may be used.

Digital content items 103 represent digital media items (for example, audio files, video files, text files, multimedia files, data files, and playlists) and metadata associated with the digital media items. Metadata is any information, in any form or format, about the digital media items. Examples of metadata include artist information, owner information, publication date, photographs, graphics, descriptive text, file size information, and the like. Digital content items 103 are generally stored on computer-readable media, such as computer-readable media 404 within a particular communication device (discussed further below in connection with FIG. 4), but may also be stored on remote computer-readable media. Digital content items 103 may be stored using any available formats or protocols, such as portable network graphics ("PNG"), joint photographic experts group ("JPEG"), moving picture experts group ("MPEG"), multiple-image network graphics ("MNG"), audio video interleave ("AVI"), extensible markup language ("XML"), hypertext markup language ("HTML"), extensible HTML ("XHTML"), MP3, WAV, WMA, WMV, or ASF.

Sink communication device 112 is any electronic device (or any physical or logical element of such an electronic device, either standing alone or included in other devices), which is configured for local communication within LAN 120 (for example, either using WLAN 116 or a particular PAN 118, or both) and which is responsive to sink entity 114. Sink entity 114 is a person or business operating sink communication device 112. Further, sink communication device 112 is capable of establishing P2P communication session 152 with source communication device 102 either directly or through the use of intermediate bridging technology. Among other things, sink communication device 112 facilitates the distribution of (generally, the receipt of) subset 105 of digital content items 103 on behalf of sink entity 114 via P2P communication session 152.

Figure 2:
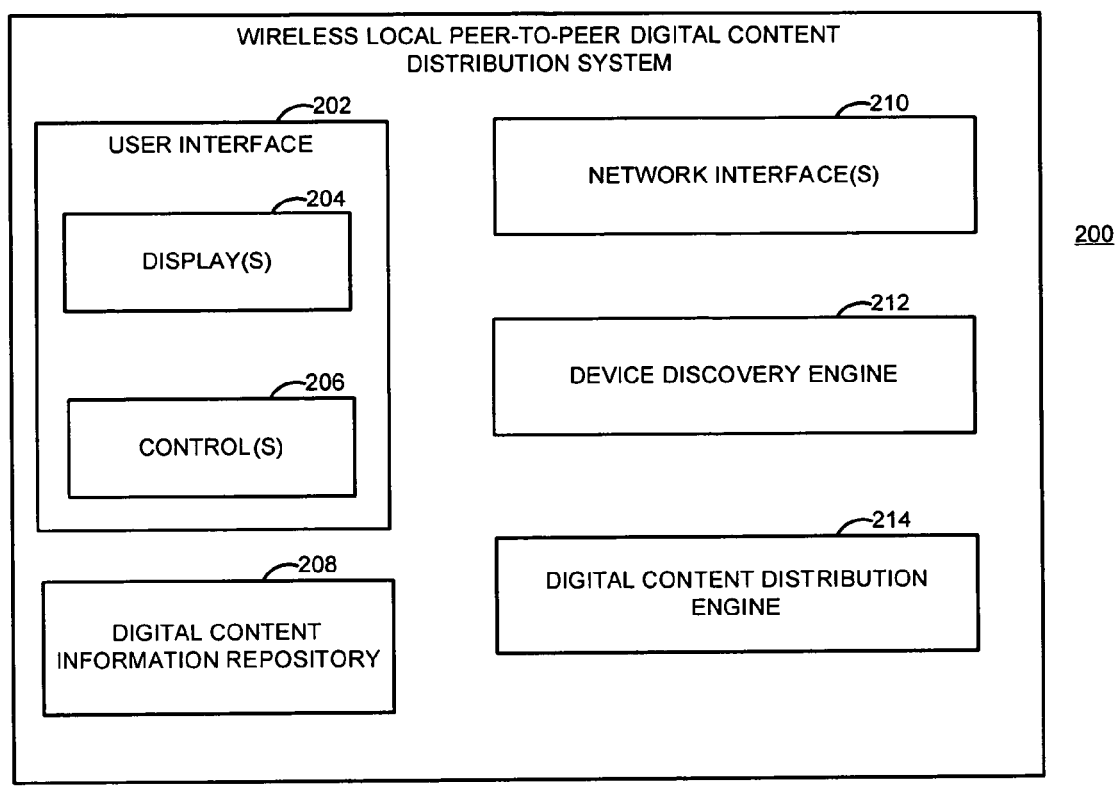
FIG. 2 is a simplified functional block diagram of a system for local, peer-to-peer distribution of digital content, configured for operation within the communication architecture shown in FIG. 1.

With continuing reference to FIG. 1, FIG. 2 is a simplified functional block diagram of a local, peer-to-peer digital content distribution system ("P2P Content Distribution System") 200, aspects of which are usable with source communication device 102 and sink communication device 112 to facilitate the distribution of selected digital content items 103 within subset 105 between source communication device 102 and sink communication device 112 via communication session 152.

P2P Content Distribution System 200 includes a user interface 202, which further includes display(s) 204 and control(s) 206; a digital content information repository 208; network interface(s) 210; a device discovery engine 212; and a digital content distribution engine 214. In general, design choices dictate how specific functions of P2P Content Distribution System 100 are implemented. Such functions may be implemented using hardware, software, or firmware, or combinations thereof.

User interface 202 represents the combination of display(s) 204 and control(s) 206 that define the way a user interacts with a particular device, such as sink communication device 102 or source communication device 112. Display(s) 204 are used to receive input from, or provide output to, a user. An example of a physical display is a monitor device. An example of a logical display is a data organization technique (for example, a window, a menu, or a layout thereof). Control(s) 206 facilitate the receipt of input from a user. An example of a physical control is an input device such as a remote control, a display, a mouse, a pen, a stylus, a trackball, a keyboard, a microphone, or a scanning device. An example of a logical control is a data organization technique (for example, a window, a menu, or a layout thereof) via which a user may issue commands. It will be appreciated that the same physical device or logical construct may function as an interface for both inputs to, and outputs from, a user.

Digital content information repository 208 represents general data storage capability for information relating to distribution of digital content items 103 via P2P communication session 152. Information storable within digital content information repository includes but is not limited to: digital content items 103; subset 105; digital content distribution criteria 302 (discussed further below, in connection with FIG. 3); digital content distribution records 324 (also discussed in connection with FIG. 3); and data storage elements, such as virtual folders 430 (shown in FIG. 4; discussed in connection with FIG. 3), used to coordinate distribution of selected digital content item(s) within subset 105 between source communication device 102 and sink communication device 112. Digital content information repository 208 may be implemented using various types and arrangements of computer-readable media 404 (discussed further below, in connection with FIG. 4).

Network interface(s) 210 represent one or more physical or logical elements, such as connectivity devices or computer-executable instructions that enable communication between source communication device 102 and sink communication device 112 via one or more protocols or techniques (such as WLAN 116 protocols or techniques or PAN 118 protocols or techniques). Information received at a given network interface may traverse one or more of the seven vertical layers of the OSI Internetworking Model: layer 1, the physical layer; layer 2, the data link layer; layer 3, the network layer; layer 4, the transport layer; layer 5, the session layer; layer 6, the presentation layer; and layer 7, the application layer.

Device discovery engine 212 is configured to implement certain aspects of local, P2P digital content distribution transactions between potential participants in such transactions. More specifically, device discovery engine 212 discovers, and determines the proximity of, potential participants in the distribution transactions based on messaging between the potential participants. Messaging is accomplished via network interface(s) 210.

In one implementation, device discovery engine 212 implements one or more features of a local networking service defined by the Universal Plug and Play peer-to-peer connectivity architecture ("UPnP™ Architecture"), which is a universal standard promulgated by the UPnP™ Forum. In the UPnP implementation, potential participants in distribution transactions have predetermined logical device types, such as "MobileMedia: 1", or "A/V MediaRenderer".

In an alternative implementation, device discovery engine 212 implements one or more features of a service defined by the Web Services Dynamic Discovery ("WS-Discovery") protocol, which is a standard that defines how services are discovered (generally, using SOAP) on a local network. Other now known or later developed implementations are also possible, such as customized Bluetooth profiles, and Zero Configuration Networking ("ZeroConf") techniques.

The primary responsibility of the service implemented by device discovery engine 212 is to reply to requests for information from potential participants in local, P2P digital content distribution transactions. Device discovery engine 212 may also handle certain aspects of establishing P2P communication session 152 via network interface(s) 210. As such, one way of handling requests from potential participants is by using a "Get/Set" metaphor to access specific service properties requested by potential participants. In general, information and properties returned by the service are simple, although more complex exchanges are possible. Additional operational details regarding aspects of the service implemented by device discovery engine 212 are discussed below, in connection with FIG. 3.

Digital content distribution engine 214 is also configured to implement certain aspects of local, P2P digital content distribution transactions between participants in such transactions. More specifically, digital content distribution engine 214 handles the core functions of identification and distribution of digital content items 103 between source communication device 102 and sink communication device 112 via P2P communication session 152. Digital content distribution engine 214 may also handle certain aspects of establishing P2P communication session 152 via network interface(s) 210.

Generally, digital content distribution engine 214 implements one or more features of a service for identifying, enumerating and exchanging objects between source communication device 102 and sink communication device 112. The service may be defined and discoverable by the UPnP™ Architecture, the WS-Discovery protocol, the Bluetooth OBEX profile, or another suitable service definition/discovery mechanism now known or later developed. The service implemented by digital content distribution engine 214 may be discoverable via a property defined on the service implemented by the device discovery engine 212—the latter service could be configured to provide the IP address and port of the former service, for example.

In one exemplary implementation, the service implemented by digital content distribution engine 214 provides support for enumerating and/or exchanging objects using Media Transfer Protocol ("MTP"). In another exemplary implementation, the service provides support for a directory-based solution for enumerating and/or exchanging objects, such as via the UPnP "AN ContentDirectory". Other now known or later developed file transfer and/or directory-based solutions are also possible.

An alternate embodiment of digital content distribution engine 214 may stipulate that only trusted parties may participate in P2P communication session 152. Establishment of trust may also require specific services of device discovery engine 212. There are numerous methods available for establishing trust between parties through authentication and authorization schemes. These include simple user name and password schemes, Kerberos technologies, or proprietary authentication mechanisms. Other known or later developed implementations may be employed by digital content distribution engine 214 or device discovery engine 212 to establish trust between the two endpoints in P2P communication session 152.

Figure 3:
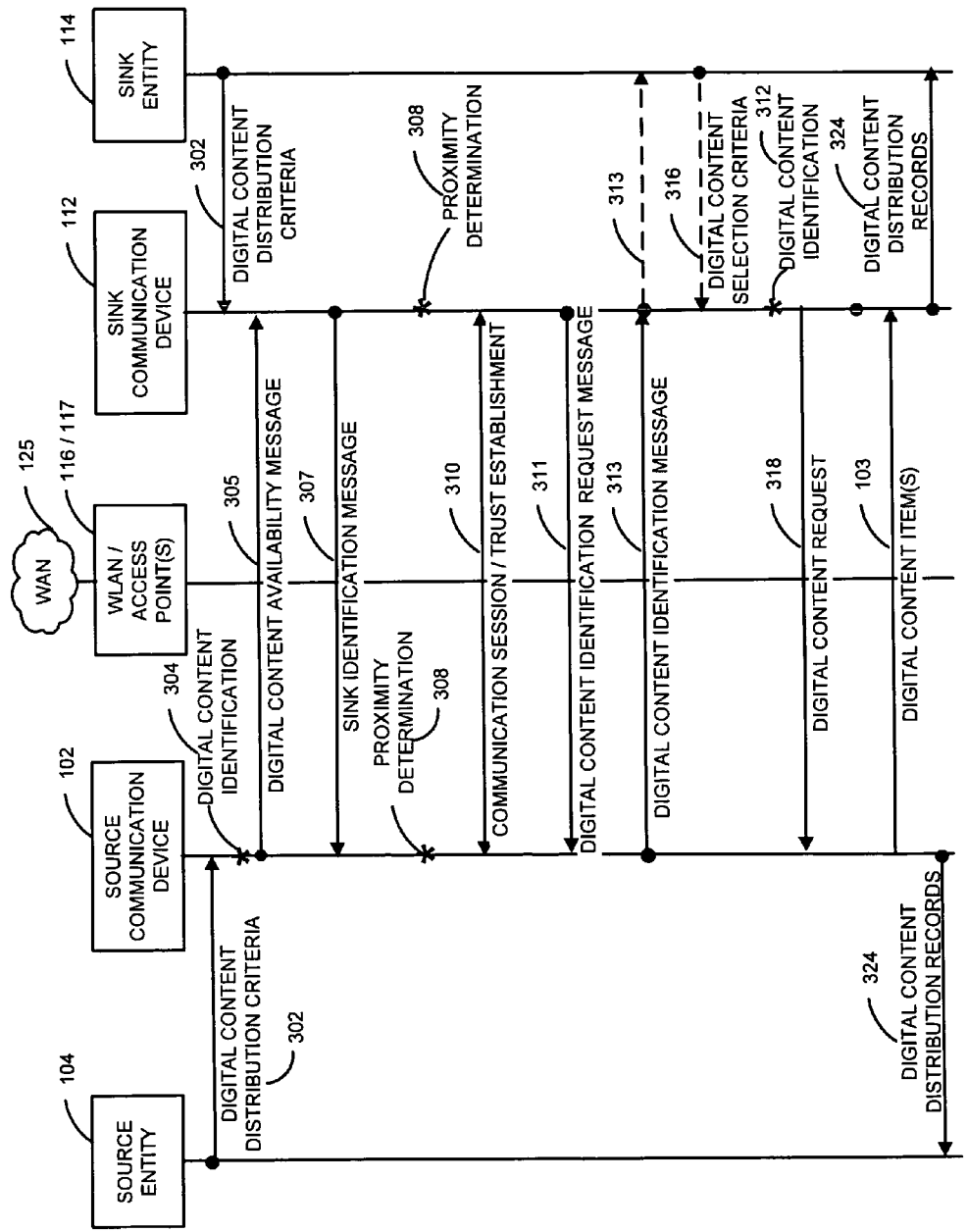
FIG. 3 is a message sequence chart illustrating certain aspects of a method for local, peer-to-peer distribution of digital content between a source communication device and a sink communication device using aspects of the system shown in FIG. 2, operating within the communication architecture shown in FIG. 1.

With continuing reference to FIGS. 1 and 2, FIG. 3 is a message sequence chart illustrating certain aspects of a method for distributing digital content in a local, P2P manner. The method(s) illustrated in FIG. 3 may be implemented using computer-executable instructions executed by one or more general, multi-purpose, or single-purpose processors (exemplary computer-executable instructions 406 and processor 402 are discussed further below, in connection with FIG. 4). Unless specifically stated, the methods described herein are not constrained to a particular order or sequence. In addition, some of the described method or elements thereof can occur or be performed concurrently. As it is generally desirable to minimize time required to complete a particular distribution transaction, it will be understood that all of the described messaging need not occur in each distribution transaction, and the type, quantity, and implementation of specific messaging is a matter of implementation preference.

For exemplary purposes, one distribution transaction is discussed. The distribution transaction involves the distribution of selected digital content items within subset 105 between source communication device 102 operated within local communication region 150 by source entity 104 and sink communication device 112 operated within local communication region 150 by sink entity 114. It will be appreciated, however, that a particular communication device may function as both a source and a sink in the same transaction or in different transactions. The exemplary distribution transaction discussed is representative of a common transaction that would occur when two previously unaffiliated people carrying portable wireless-enabled media players (referred to as "George" and "David") are in the vicinity of a WLAN access network or access point, such as a WiFi hotspot in a coffee shop. It is assumed that George is the operator of source communication device 102 and that David is the operator of sink communication device 112. As used herein, the term "distribution" and forms thereof includes both acts associated with transferring digital content by source communication device 102 and acts associated with receiving digital content by sink communication device 112.

Initially (and optionally at appropriate points throughout the distribution transaction), source communication device 102 and sink communication device 112 receive and/or evaluate digital content distribution criteria 302. Digital content distribution criteria 302 represent any information usable by source communication device 102 or sink communication device 112 for decision-making regarding distribution of selected digital content item(s) within subset 105 between source communication device 102 and sink communication device 112. As such, digital content distribution criteria 302 are used to: identify item(s) within subset 105; select which item(s) within subset 105 are to be distributed; determine how selected item(s) within subset 105 are distributed; determine where or when selected item(s) within subset 105 are distributed; and determine to whom selected item(s) within subset 105 are distributed. As shown, digital content distribution criteria 302 are received from source entity 104 and sink entity 114 (via user interface 102, for example). Alternatively, digital content distribution criteria 302 may be received in other ways, such as by being pre-programmed into source communication device 102 or sink communication device 112, or received via LAN 120 or WAN 125. In another alternative, digital content distribution criteria 302 may come from a third party (for example, a local or remote service) rather than directly from the participants in the distribution transaction.

Examples of digital content distribution criteria 302 include but are not limited to information regarding: a user's various favorites or preferences (for example, a user's ratings of music, a user's listening patterns, or a user's purchasing patterns); user profiles (for example, personal information such as name, address, gender, and age); service profiles (whether a user has opted-in to participation local, peer-to-peer distribution transactions, for example, and opt-in conditions, if any); user affiliations (such as buddy lists); device-gathered location information; and digital rights management information associated with digital content information items 103 (such as whether a user has the right to distribute a particular digital content item, or any restrictions on such rights). Digital content distribution criteria 302 may also include expressions involving logical references to other digital content distribution criteria 302 or to digital content items 103. Boolean operands such as "AND," "OR," and "NOT", along with other operands or types thereof, may be used to define such expressions. It will be appreciated that virtually unlimited digital content criteria 302 and combinations thereof are definable.

As shown in FIG. 3, source communication device 102 uses digital content distribution criteria 302 for decision-making regarding digital content identification 304. Digital content identification 304 represents acts associated with identifying subset 105 of digital content items 103 that is available for distribution by source communication device 102 using P2P Content Distribution System 200. It may be desirable to represent and/or store digital content items 103 within subset 105 in a dedicated area of digital content information repository 208 within source communication device 102.

In one scenario, digital content identification 304 involves source entity 104 manually selecting one or more digital content items 103 for inclusion in subset 105 via user interface 102. In another scenario, digital content identification 304 involves source communication device 102 automatically selecting one or more digital content items 103 for inclusion in subset 105. With respect to automatic selection, source communication device 102 may evaluate expressions of digital content criteria 302 designed to identify items within subset 105. For example, the last audio file without DRM restrictions received from another source communication device in a particular WiFi hotspot may be automatically selected for inclusion in subset 105. In another example, a list of recently played music may be selected for inclusion in subset 105.

Referring again to the flowchart of FIG. 3, source communication device 102 proceeds to publish digital content availability message 305 to other nodes within WLAN 116, including sink communication device 112 (it is assumed that source communication device 102 and sink communication device 112 have both entered local communication region 150 served by LAN 120 and have acquired IP addresses or other endpoint identifiers. It will be appreciated that IP-based services are not required to implement aspects of the distribution transactions discussed herein. Digital content availability message 305 is any signal transmitted using any suitable protocol by or on behalf of source communication device 102 for the purpose of notifying other nodes within LAN 120 of the availability of digital content for distribution via P2P Content Distribution System 200.

If aspects of device discovery engine 212 are implemented as a UPnP service, for example, digital content availability message 305 may be a discovery message, multicast a number of times by source communication device 102 via the UPnP discovery protocol, which is based on the Simple Service Discovery Protocol ("SSDP"). The discovery message generally contains a few specifics about source communication device 102 (such as the model name and number, serial number, or manufacturer name) and/or services implemented by device discovery engine 212 or digital content distribution engine 214 (for each service, the description may include a list of commands/actions the service responds to, and parameters/arguments for each command/action), and a pointer to more detailed information. The message content may be defined using properties encoded using an extensible markup language ("XML") schema or another technique. XML properties generally have names specified using strings, have assumed types, and assume simple fixed values.

Referring again to FIG. 3, sink communication device 112 detects digital content availability message 305 and transmits sink identification message 307. Sink identification message 307 is any signal transmitted, using any suitable protocol, by or on behalf of sink communication device 112 for the purpose of identifying the availability of the sink communication device for distribution transactions via P2P Content Distribution System 200.

In general, if device discovery engine 212 implements the UPnP™ Architecture, sink communication device 112 may be configured to automatically search a predefined multicast address for discovery messages sent by potential participants in digital content distribution transactions and to use the information in the discovery message to send a sink identification message 307 to source communication device 102. Alternatively, sink communication device 112 may be configured to notify sink entity 114 prior to searching for discovery messages or sending sink identification message 307. If communication device 112 is configured to notify sink entity 114, then some form of user interface is generally provided via user interface 102.

The service implemented by discovery engine 212 is generally configured to respond to requests for information from sink communication device 112 regarding the properties of the service. For example, the service is generally able to respond correctly for properties it recognizes, and provide at least a "property not found" result if the property is not available. One example of a defined property of the service implemented by device discovery engine 212 is a property that provides information about the IP address and port for a service (such as a service implemented by Digital Content Distribution Engine 214) responsible for enumeration and distribution of digital content items 103 within subset 105.

In one implementation, sink identification message 307 is a UPnP description query message. The description query message generally contains a few specifics about sink communication device 112, such as an IP address for communication, and queries regarding the properties of the discovery message. In operation, to obtain a device description, sink communication device 112 issues a "Get" request on the URL for source communication device 102 provided in the discovery message. To obtain a service description, sink communication device 112 issues a "Get" request on the URL within the device description.

Referring again to FIG. 3, based on digital content availability message 305 and/or sink identification message 307, a proximity determination 208 is performed by source communication device 102, sink communication device 112, or both. Proximity determination 208 represents one or more automatic or manual acts or criteria for determining whether source communication device 102 and sink communication device 112 are available for the purpose of distributing digital content items 103 selected from subset 105 using P2P Content Distribution System 200. Proximity may be determined on a periodic basis. Although the exemplary distribution transaction involves source communication device 102 operated by source entity 104 and sink communication device 112 operated by sink entity 114, it will be appreciated that proximity determination 208 may involve automatic or manuals acts or criteria for determining whether other communication devices are available for distribution transactions, and that proximity determination 208 may result in identification of a subset proximate devices and/or entities.

One circumstance under which source communication device 102 and sink communication device 112 may be deemed to be in proximity is when source communication device 102 and sink communication device 112 are within a certain physical distance from each other. In one example, the boundaries of local communication region 150 provide the limits of the physical distance—whenever both source communication device 102 and sink communication device 112 are both within local communication region 150, proximity is deemed to exist. In this example, proximity would be deemed to exist when sink communication device 112 scans areas served by LANs 120 (for example, scans areas served by access point(s) 117 or scans directly for signals received from other devices) and discovers digital content availability message 305 published by source communication device 102.

In another example, proximity is deemed to exist when both source communication device 102 and sink communication device 112 are within static or dynamic physically definable sub-regions of local communication region 150. Examples of static physically definable sub-regions of local communication region 150 include particular geographical regions such as departments of retail locations (music sales departments, for example), streets, or buildings. An example of a dynamic physically definable sub-region of local communication region 150 includes a predetermined maximal distance between source communication device 102 and sink communication device 112.

If physically-definable sub-regions are used to determine whether source communication device 102 and sink communication device 112 are in proximity, certain digital content distribution criteria 302 associated with source communication device 102 and/or source entity 102 could be evaluated and/or exchanged (for example, via digital content availability message 305 or sink identification message 307) to evaluate physically-definable sub-regions or logical relationships between source entity 104 and sink entity 114. For example, in the case of physically-definable sub-region determinations, location determinations may be made by source communication device 102, sink communication device 112, LAN 120, or WAN 125, and transmitted along with digital content availability message 305 or sink identification message 307. Various commercially available systems and/or products may be used for location determination. Such systems and/or products are generally based on technologies such as global positioning system ("GPS") technology, triangulation technology, signal strength analysis technology, or time-distance-of-arrival technology.

Other circumstances under which source communication device 102 and sink communication device 112 may be deemed to be in proximity are defined by one or more logical relationships between source entity 104 and sink entity 114. Such logical relationships may be used alone, or as filters in conjunction with certain physical distances, to determine when source communication device 102 and sink communication device 112 are in proximity. For example, source and sink entities within local communication region 150 or sub-regions thereof that have predetermined zip codes, genders, ages, preferences (such as music preferences), friends, or other logically-relatable characteristics may be deemed to be in proximity. A logical relationship generally exists and is determined independent of other, pre-established affiliations (such as buddies on a buddy list), although in some cases such pre-established affiliations my co-exist with a particular a logical relationship. With respect to logical relationships, certain relevant digital content distribution criteria 302 may be established and transmitted (separately, along with, or referenced within, digital content availability message 305 or sink identification message 307) and evaluated by sink communication device 112 or source communication device 102. It will be accordingly appreciated that proximity may be defined as broadly or narrowly as desired, encompassing everyone/every device or only select entities or devices.

Referring again to the message sequence chart of FIG. 3, after proximity between source communication device 102 and sink communication device 104 has been deemed to exist, communication session establishment 310 occurs. Communication session establishment 310 involves establishing P2P communication session 152 between source communication device 102 and sink communication device 104. It should be noted that communication session establishment 310 may be deemed to have occurred whenever proximate devices are able to discover each other. For example, communication session establishment 310 may be deemed to have occurred when source communication device 102 and sink communication device 112 communicated via digital content availability message 305 and sink identification message 307. In general, however, communication establishment 310 involves additional steps relating to establishing a level of trust between source communication device 102 and sink communication device 112, which may be established using any desirable now known or later developed technology Establishing such a level of trust is generally desirable because the nature of wireless content distribution has the potential to broadcast private information to virtually unknown entities. For example, digital content distribution engine 214 may stipulate that only trusted parties may participate in P2P communication session 152.

In one implementation, communication session establishment 310 involves the performance of security-related authentication, authorization, and accounting ("AAA") activities by LAN 120, WAN 125, source communication device 102, and/or sink communication device 112 to establish P2P communication session 152. Authentication is the process of identifying a user. Authorization is the process of enforcing policies relating to what types of qualities of activities, resources, or services the user is permitted to access. Authentication may also encompass the authorization process. Accounting measures the resources a user accesses during a particular distribution transaction.

AAA activities associated with communication session establishment 310 may be similar to those that have been defined and standardized by the Internet Engineering Task Force ("IETF"), although specific types, amounts, and implementation of AAA activities is a matter of design choice. Some examples of security-related AAA activities are simple user name and password schemes, Kerberos technologies, or proprietary authentication mechanisms. Certain security-related AAA activities may also be performed as part of digital rights management ("DRM"). DRM is any collection of tools or techniques that enables the legal sharing of digital content, which is often protected by enforceable intellectual property rights such as copyrights, patent rights, or trademark rights.

Once P2P communication session 152 has been established, sink communication device 112 and source communication device 102 commence communication about a specific digital content distribution transaction. As shown in FIG. 3, sink communication device 112 sends digital content identification request message 311 to source communication device 102. Digital content identification request message 311 is any signal transmitted, using any suitable protocol, by or on behalf of sink communication device 112 for the purpose of requesting participation in a distribution transaction via P2P Content Distribution System 200. Digital content identification request message 311 may be sent to a service operating within source communication device 102, such as digital content distribution engine 214. In operation, digital content identification request message 311 may be a command issued by sink communication device 112 to the URL for digital content distribution engine 214 previously obtained from source communication device 102.

In one implementation, digital content identification request message 311 includes a request for an identification of each digital content item 103 within subset 105. In an alternative implementation, digital content identification request message 311 includes a request to use certain digital content criteria 302 to automatically identify one or more digital content items 103 within subset 105 for distribution without direct input from sink entity 114. Digital content criteria 302 may be communicated to source communication device 102 using a message such as digital content identification request message 311 or a subsequent message in various ways—digital content criteria 302 may be attached to a message, or the message may include a pointer to digital content criteria 302, for example.

With reference to the exemplary distribution transaction between George and David, who are both near the same WiFi hotspot in a coffee shop, David may be operating the feature on his portable media player (sink communication device 112) that implements P2P Content Distribution System 200 in "manual" mode or in "automatic" mode. In manual mode, David would be alerted that his portable media player has detected George, and David would be prompted to indicate whether he would like to investigate digital content available for distribution by George. For example, a reference to George (such as an avatar or screen name or the like) may appear on David's user interface, and David may select George via the user interface. David's selection of George via the user interface results in digital content identification request message 311 being transmitted to George's portable media player.

In automatic mode, David may or may not be alerted that his portable media player has detected George. Digital content available for distribution by George would be investigated without further input from David, based on pre-determined digital content distribution criteria 302 on David's portable media player (for example, David's portable media player would automatically transmit digital content identification request message 311/digital content distribution criteria 302 to George's portable media player). It should be noted that even when David begins the distribution transaction in manual mode, he may choose to complete the transaction or portions thereof in automatic mode—that is, David may choose to request an identification of each digital content item George has available for distribution, or he may choose to allow certain digital content items to be automatically identified and/or distributed based on digital content distribution criteria 302.

Referring again to FIG. 3, in response to digital content identification request message 311, source communication device 102 transmits digital content identification message 313 to sink communication device 112. Digital content identification message 313 is any signal transmitted, using any suitable protocol, by or on behalf of source communication device 102 for the purpose of communicating information about the content of subset 105 of digital content information items 103 to sink communication device 112 and/or sink entity 114.

In the scenario where content identification request message 311 includes a request for an identification of each digital content item 103 within subset 105, digital content identification message 313 may include a pointer to the contents of a location (such as a virtual folder or a catalog) within data repository 208 in (or accessible via) source communication device 102 that includes information about digital content item(s) within subset 105 (and optionally the item(s) themselves). The contents of the location may be arranged or referenced in a manner that enables source entity 114 to view and evaluate the content via a user interface. Examples of suitable content arrangements include tables, lists (such as a playlist), or catalogs. To view the content, source communication device 112 may issue a "Get" request on the URL for the location provided in digital content identification message 313. It will be appreciated that the URL for the location may have been provided in a previously transmitted message. In this case, digital content identification message 313 may not be necessary.

In the scenario where content identification request message 311 includes a request to use certain digital content criteria 302 to automatically select one or more digital content items 103 within subset 105 for distribution without direct input from sink entity 114, digital content identification message 313 may identify certain digital content items 103 within subset 105 that meet digital content criteria 302 (for example, based on the best match of digital content criteria 302 received via digital content identification request message 311). For example, digital content identification message 313 may include a pointer to the contents of a location within data repository 208 in (or accessible via) source communication device 112 that includes information about objects within subset 105 (and optionally the objects themselves) that meet digital content criteria 302. Alternatively, digital content identification message 313 may include other information pertinent to automatically identifying one or more digital content items 103 within subset 105, such as additional digital content distribution criteria 302 associated with source communication device 102, or information about possible matches to digital distribution criteria 302 of the sink communication device. Such other information may be used in a further negotiation between source communication device 102 and sink communication device 112, which is designed to automatically identify certain digital content items within subset 105.

Next, sink communication device 112 uses digital content distribution criteria 302 for decision-making regarding digital content identification 312. Digital content identification 312 represents acts (performed by sink communication device 112 and/or sink entity 114) associated with selecting specific digital content items 103 within subset 105 from among those communicated, via digital content identification message 313, as being available for distribution from source communication device 102. Digital content identification 312 can be implemented in at least two ways—with real-time input from sink entity 114, or automatically, without real-time input from sink entity 114.

In the scenario where digital content identification 312 is implemented with real-time input from sink entity 114, sink entity 114 generally inputs digital content selection criteria 316 via user interface 102, which displays the contents of subset 105 (for example, the contents of the location within source communication device 102, accessed via a "Get" request on the URL for the location provided in digital content identification message 313 or another message). Sink communication device 112 identifies the digital content item to be requested based digital content selection criteria 316.

With reference to the exemplary distribution transaction between George and David, if David is operating his portable media player in manual mode, references to digital content available for distribution by George may appear on David's user interface, in the vicinity of the reference to George. David would be prompted to select from among the available digital content. David's selection of one or more digital content items serves as digital content selection criteria 316 that results in his portable media player identifying the digital content item to be requested.

In the scenario where digital content identification 312 is implemented automatically, if digital content identification message 313 includes a final identification of one or more digital content items from subset 105 to be distributed, further digital content identification 312 may not be necessary. Alternatively, if further digital content identification 312 is necessary, sink communication device 112 may select one or more digital content items within subset 105 to be requested based on the evaluation (for example, a determination of the best match) of digital content distribution criteria 302 (or other information) received from source communication device 102 via digital content identification message 313. For example, digital content identification 312 may involve evaluating criteria or expressions designed to filter received content by type (such as music files, further filtered by criteria such as artist, title, genre, and the like); general favorites or preferences; ratings or parental control settings; file size; source entity (for example, only receive content from friends of friends); or communication device-related parameters (such as battery power or available memory). It will be appreciated that other criteria or expressions are also possible.

With reference to the exemplary distribution transaction between George and David, if David is operating his portable media player in automatic mode, then references to digital content available for distribution by George may or may not appear on David's user interface. Further negotiation between David's and George's portable media players may be necessary to select digital content items for distribution, but such negotiations are conducted without further input from David.

Referring again to FIG. 3, digital content request message 318 is any signal transmitted, using any suitable protocol, by or on behalf of sink communication device 112 for the purpose of requesting distribution of one or more specific digital content items 103 within subset 105. Source communication device 102 receives digital content request message 318, and based on the message, distributes the specific digital content item(s) 103 or information used for obtaining the specific digital content item(s) (if such information has not previously been provided).

Digital content request message 318 includes either a request for a one-time distribution of digital content item(s) 103 or a request for a subscription to updates of digital content item(s) 103, or both.

To accomplish one-time distribution of digital content item(s) 103, digital content request message 318 may be a copy command or a command such as a "Get" request on the addresses of MTP connections provided for the digital content item(s) via digital content identification message 313. If digital content identification message 313 did not contain the addresses of such MTP connections, digital content request message 318 may request the addresses, and source communication device 102 and/or sink communication device 112 may initiate the copy command. It will be appreciated that other file transfer protocols or techniques are also possible.

If digital content item(s) are protected by intellectual property rights that restrict distribution of the digital content item(s), then in lieu of (or in addition to) providing the digital content item(s), source communication device 102 may provide information about the protected content, such as where to request a formal license to the protected content or where to obtain the protected content itself. Alternatively, a limited license to use, reproduce and/or distribute the protected content may be provided with the protected content. In one example, the limited license may allow a single use or distribution of the protected content.

To accomplish a subscription to updates of digital content item(s), a service to handle such subscriptions (such as a service implemented by digital content distribution engine 214) may be provided. One approach for handling subscriptions is to establish (or contract with a third party for) a web service, accessible via WAN 125 (for example, the Internet), to which source communication device 102 may write, and from which sink communication device 112 may read. The web service is then available as an intermediary for updates of content when source communication device 102 and sink communication device 112 are not in proximity. In one implementation, digital content distribution engine 214 can be configured to be an RSS-aware system, so that RSS feeds would be available whenever access to WAN 125 is available. Alternatively, digital content distribution engine 214 may support asynchronous messaging paradigms such as "pub/sub". Other distribution-related features are also possible. For example, portions of digital content item(s), such as content slices, may be distributed as they become available (using the pub/sub model, for example). In another example, if distribution of digital content item(s) is interrupted for some reason (such as if a participant in the distribution transaction travels out of range of P2P communication session 152, or because of interference or other data distribution loss), the distribution transaction may automatically resume when the participants next becomes proximate. Alternatively, another distribution transaction for the same digital content item(s) may automatically be established whenever the digital content items(s) are available from another source. It will be appreciated that a wide variety of features, functions, and user experiences may be created using aspects of the digital content distribution systems and techniques described herein.

Referring again to FIG. 3, digital content distribution records 324, which summarize pertinent information about distribution transactions (such as parties involved, digital content item(s) transferred, where the transactions occurred, and the like), are created and managed. Digital content distribution records 324 may be used by source entity 102 and sink entity 114 to track operation of P2P Content Distribution System 200. It may be desirable to create a location (such as a virtual folder or another construct, such as a catalog or a list) within data repository 208 in (or accessible via) sink communication device 112 that includes digital content items received via P2P distribution transactions, and digital content distribution records 324. The contents of the location may be arranged or referenced in a manner that enables sink entity 114 to view and evaluate the content via a user interface. A similar location (or the same location) may be used to track digital content items distributed via P2P distribution transactions.

With reference to the exemplary distribution transaction between George and David, David interacts with his portable media player, and notices that digital content distributed from George appears within a folder configured to store information received via P2P distribution transactions. David also notices that the digital content is tagged as being received at the coffee shop from George. George also interacts with his portable media player, and notices that someone (David may or may not have revealed his identity) in the coffee shop downloaded some of the digital content George made available for distribution via P2P distribution transactions.

The digital content distribution systems and techniques described herein enable a wide variety of digital content, such as digital media items (for example, audio files, video files, text files, multimedia files, data files, and playlists) and metadata associated with such digital media items, to be discovered and distributed by proximate communication devices in a local, peer-to-peer manner. As more entities participate in local, P2P digital content distribution transactions, the opportunities to discover fresh digital content can become virtually ubiquitous—distribution transactions may occur potentially wherever participating communication devices co-exist. Communication devices may function as both sources and sinks in the same transaction, thus increasing opportunities for cross-pollination of digital content. A sink communication device that receives particular digital content may later become a source communication device that supplies the same digital content, providing an interesting business model for digital content distribution.

From a user perspective, a diverse social network is developed and the chore of discovering digital content is reduced in a secure, legal, unobtrusive manner. Users are presented with abundant, flexible, options for customization and control of discovery and distribution options. For example, asynchronous distribution transactions may occur with or without active user participation, allowing a user to manage disruptions associated with digital content discovery and distribution. In another example, a user may limit (or expand) participants with whom, and venues within which, distribution transactions can occur.

With continued reference to FIGS. 1-3, FIG. 4 is a block diagram of an exemplary configuration of an electronic device 400 (such as source communication device 102 or sink communication device 112) in which all or part of P2P Content Distribution System 200, and/or the methods shown and discussed in connection with FIG. 3, may be implemented or used. Electronic device 400 is generally indicative of a wide variety of general-purpose or special-purpose computing environments, and is not intended to suggest any limitation as to the scope of use or functionality of the system(s) and methods described herein. For example, electronic device 400 may be a type of portable digital media player, a personal computer ("PC"), a personal digital assistant, or a mobile phone, among other things.

As shown, electronic device 400 includes processor 402, computer-readable media 404, and computer-executable instructions 406. One or more internal buses 420, which are widely available elements, may be used to carry data, addresses, control signals and other information within, to, or from electronic device 400 or elements thereof.

Processor 402, which may be a real or a virtual processor, controls functions of electronic device 400 by executing computer-executable instructions 406. Processor 402 may execute instructions 406 at the assembly, compiled, or machine-level to perform a particular process.

Computer-readable media 404 represent any number and combination of local or remote devices, in any form, now known or later developed, capable of recording or storing computer-readable data, such as computer-executable instructions 406, digital content items 103, digital content distribution criteria 302, digital content distribution records 324, or data storage elements such as virtual folders 430. In particular, computer-readable media 404 may be, or may include, a semiconductor memory (such as a read only memory ("ROM"), any type of programmable ROM ("PROM"), a random access memory ("RAM"), or a flash memory, for example); a magnetic storage device (such as a floppy disk drive, a hard disk drive, a magnetic drum, a magnetic tape, or a magneto-optical disk); an optical storage device (such as any type of compact disk or digital versatile disk); a bubble memory; a cache memory; a core memory; a holographic memory; a memory stick; or any combination thereof.

Computer-executable instructions 406 represent any signal processing methods or stored instructions. Generally, computer-executable instructions 406 are implemented as software components according to well-known practices for component-based software development, and encoded in computer-readable media (such as computer-readable media 404). Computer programs may be combined or distributed in various ways. Computer-executable instructions 406, however, are not limited to implementation by any specific embodiments of computer programs, and in other instances may be implemented by, or executed in, hardware, software, firmware, or any combination thereof.

As shown, certain computer-executable instructions 406 implement user interface functions 403, which implement aspects of user interface 202 (shown in FIG. 2); certain computer-executable instructions 406 implement network interface functions 410, which implement aspects of network interface(s) 210; certain computer-executable instructions 406 implement device discovery functions 412, which implement aspects of device discovery engine 212; and certain computer-executable instructions 406 implement digital content distribution functions 414, which implement aspects of digital content distribution engine 414.

Input interface(s) 416 are physical or logical elements that facilitate receipt of input to electronic device 400. Input may be received using any type of now known or later-developed physical or logical elements, such as user interfaces, remote controls, displays, mice, pens, styluses, trackballs, keyboards, microphones, scanning devices, and all types of devices that are used input data.

Output interface(s) 418 are physical or logical elements that facilitate provisioning of output from electronic device 400. Output may be provided using any type of now known or later-developed physical or logical elements, such as user interfaces, displays, printers, speakers, disk drives, and the like.

Network interface(s) 210 (discussed in more detail above, in connection with FIG. 2) are one or more physical or logical elements that enable communication by electronic device 400 via one or more protocols or techniques.

Specialized hardware 422 represents any hardware or firmware that implements functions of electronic device 400. Examples of specialized communication hardware 460 include encoder/decoders ("CODECs"), application-specific integrated circuits, and the like.

It will be appreciated that particular configurations of electronic device 400 or P2P Content Distribution System 200 may include fewer, more, or different components or functions than those described. In addition, functional components of electronic device 400 System 200 may be implemented by one or more devices, which are co-located or remotely located, in a variety of ways.

Various aspects of local, peer-to-peer digital content distribution transactions have been described. Although the subject matter herein has been described in language specific to structural features and/or methodological acts, it is also to be understood that the subject matter defined in the claims is not necessarily limited to the specific features or acts described above. Rather, the specific features and acts described above are disclosed as example forms of implementing the claims.

It will further be understood that when one element is indicated as being responsive to another element, the elements may be directly or indirectly coupled. Connections depicted herein may be logical or physical in practice to achieve a coupling or communicative interface between elements. Connections may be implemented, among other ways, as inter-process communications among software processes, or inter-machine communications among networked computers.

The word "exemplary" is used herein to mean serving as an example, instance, or illustration. Any implementation or aspect thereof described herein as "exemplary" is not necessarily to be constructed as preferred or advantageous over other implementations or aspects thereof.

As it is understood that embodiments other than the specific embodiments described above may be devised without departing from the spirit and scope of the appended claims, it is intended that the scope of the subject matter herein will be governed by the following claims.

The invention claimed is:

1. A non-transitory computer-readable storage medium, not comprising a propagated data signal or transmission media, which is encoded with computer-executable instructions which when executed by a processor, perform a method for distributing digital content between a source communication device operable by a source entity and a sink communication device operable by a sink entity, the method comprising:

without consulting a network-based entity, identifying a digital content item to be distributed based on one or more criteria specified by the source communication device or the sink communication device or both, the digital content item stored on a computer-readable medium accessible by the source communication device;

determining a proximity of the source communication device and the sink communication device, the proximity based both on whether the source entity and the sink entity have a common prior affinity, the common prior affinity comprising a logical relationship between the source entity and the sink entity that establishes a level of trust between the source communication device and the sink communication device, and on whether the source communication device is proximate to the sink communication device within a predetermined, static geographical sub-region of a local communication region;

if the source communication device and the sink communication device are determined to be in proximity because the source entity and the sink entity have a common prior affinity and the source communication device is proximate to the sink communication device within a predetermined, static geographical sub-region of a local communication region, establishing a peer-to-peer communication session between the source communication device and the sink communication device; and arranging for asynchronous distribution, via the peer-to-peer communication session, of the identified digital content item from the computer-readable medium accessible by the source communication device to a computer-readable medium associated with the sink communication device.

2. The computer-readable storage medium according to claim 1, wherein the digital content item comprises one of an audio sample, a video sample, an image, a multimedia file, a playlist, and metadata.

3. The computer-readable storage medium according to claim 1, wherein establishing a peer-to-peer communication session comprises arranging for validation of the sink communication device.

4. The computer-readable storage medium according to claim 1, wherein the step of establishing the peer-to-peer communication session comprises:
obtaining a first Internet Protocol ("IP") address associated with the source communication device;
obtaining a second IP address associated with the sink communication device; and
using a predetermined communication protocol for communication between the first IP address and the second IP address.

5. The computer-readable storage medium according to claim 4, wherein the predetermined communication protocol comprises one of a Wireless Fidelity ("WiFi") communication protocol, and a HiperLAN communication protocol.

6. The computer-readable storage medium according to claim 1, wherein the step of establishing the peer-to-peer communication session comprises:
obtaining an address of a first endpoint in a personal area network, the first endpoint associated with the source communication device;
obtaining an address of a second endpoint in the personal area network, the second endpoint associated with the sink communication device; and
using a predetermined communication protocol for communication between the address of the first endpoint and the address of the second endpoint.

7. The computer-readable storage medium according to claim 6, wherein the predetermined communication protocol comprises one of a Bluetooth communication protocol and a Wireless USB communication protocol.

8. The computer-readable storage medium according to claim 1, wherein the predetermined distribution protocol comprises one of Universal Plug and Play Protocol, Web Services Device Profile, and Media Transfer Protocol.

9. The computer-readable storage medium according to claim 1, wherein the one or more criteria are selected from the group comprising: file size, content type, security associations, and user-focused items.

10. The computer-readable storage medium according to claim 1, wherein identifying the digital content item comprises:
publishing an availability of the digital content item;
receiving a request from the sink communication device for access to the digital content item; and
based on the request, identifying the digital content item.

11. The computer-readable storage medium according to claim 1, wherein identifying the digital content item comprises:
requesting information associated with the digital content item via the peer-to-peer communication session.

12. The computer-readable storage medium according to claim 1, wherein requesting information associated with the digital content item comprises one of requesting a one-time receipt of the digital content item, and requesting a subscription to updates of the digital content item.

* * * * *